US008381966B2

(12) United States Patent
Kumar et al.

(10) Patent No.: US 8,381,966 B2
(45) Date of Patent: Feb. 26, 2013

(54) FLIP CHIP ASSEMBLY METHOD EMPLOYING POST-CONTACT DIFFERENTIAL HEATING

(75) Inventors: Rajneesh Kumar, Poughkeepsie, NY (US); Jae-Woong Nah, New York, NY (US); Eric D. Perfecto, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/036,086

(22) Filed: Feb. 28, 2011

(65) Prior Publication Data

US 2012/0217287 A1 Aug. 30, 2012

(51) Int. Cl.
*B23K 31/02* (2006.01)
*H01L 21/44* (2006.01)
(52) U.S. Cl. .............. 228/180.22; 228/178; 228/180.21; 438/108; 438/612; 438/613
(58) Field of Classification Search .................. 228/178, 228/180.22, 180.21; 438/108, 612, 613
See application file for complete search history.

(56) References Cited

U.S. PATENT DOCUMENTS

| 4,481,403 | A | * | 11/1984 | Del Monte | 219/209 |
| 5,751,552 | A | * | 5/1998 | Scanlan et al. | 361/707 |
| 6,077,382 | A | * | 6/2000 | Watanabe | 156/322 |
| 6,581,821 | B2 | * | 6/2003 | Sarkhel | 228/180.21 |
| 7,078,819 | B2 | * | 7/2006 | DiStefano | 257/779 |
| 7,235,886 | B1 | | 6/2007 | Chandran et al. | |
| 2004/0152238 | A1 | * | 8/2004 | Maeda et al. | 438/108 |
| 2008/0248610 | A1 | * | 10/2008 | Chew et al. | 438/108 |

* cited by examiner

*Primary Examiner* — Keith Walker
*Assistant Examiner* — Devang R Patel
(74) *Attorney, Agent, or Firm* — Scully, Scott, Murphy & Presser, P.C.; Louis J. Percello, Esq.

(57) ABSTRACT

A first substrate mounted to a bonder head and a second substrate mounted to a base plate are held at different elevated temperatures at the time of bonding that provide a substantially matched thermal expansion between the second substrate and the first substrate relative to room temperature. Further, the temperature of the solder material portions and the second substrate is raised at least up to the melting temperature after contact. The distance between the first substrate and the second substrate can be modulated to enhance the integrity of solder joints. Once the distance is at an optimum, the bonder head is detached, and the bonded structure is allowed to cool to form a bonded flip chip structure. Alternately, the bonder head can control the cooling rate of solder joints by being attached to the chip during cooling step.

17 Claims, 6 Drawing Sheets

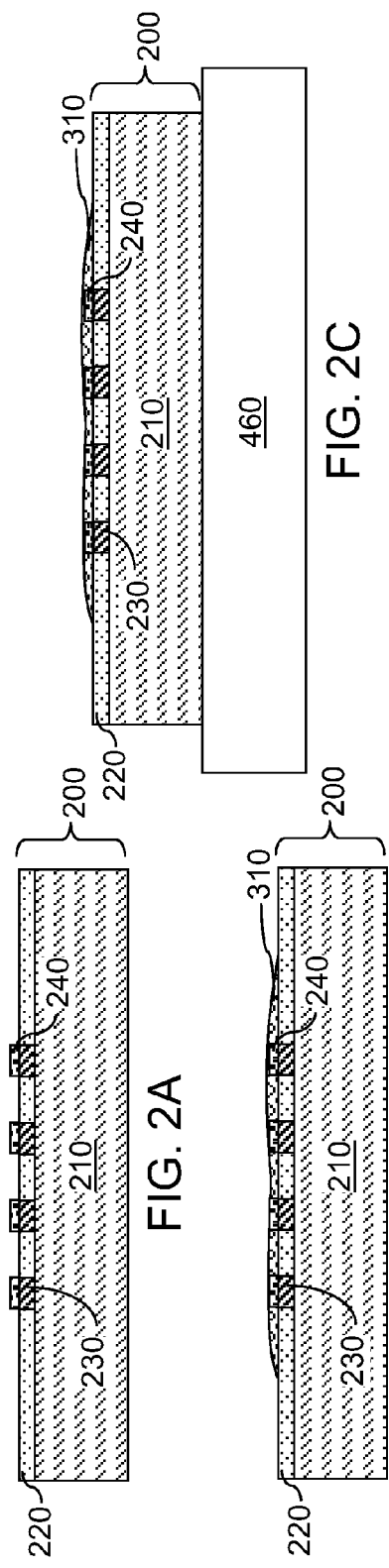
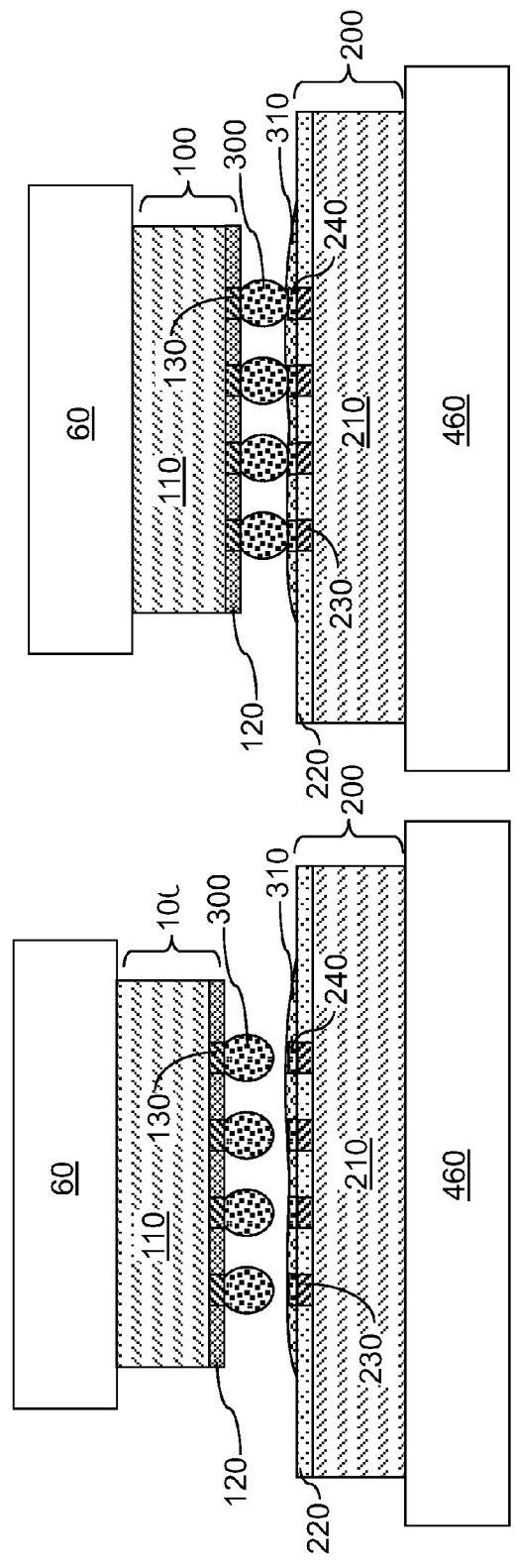

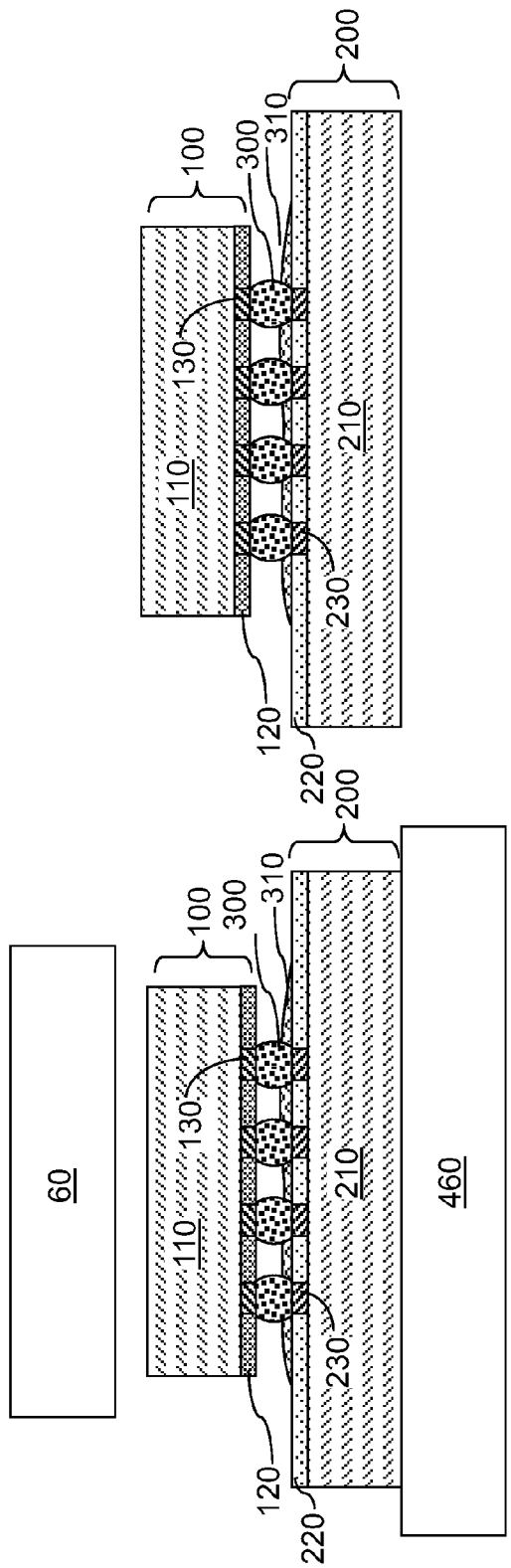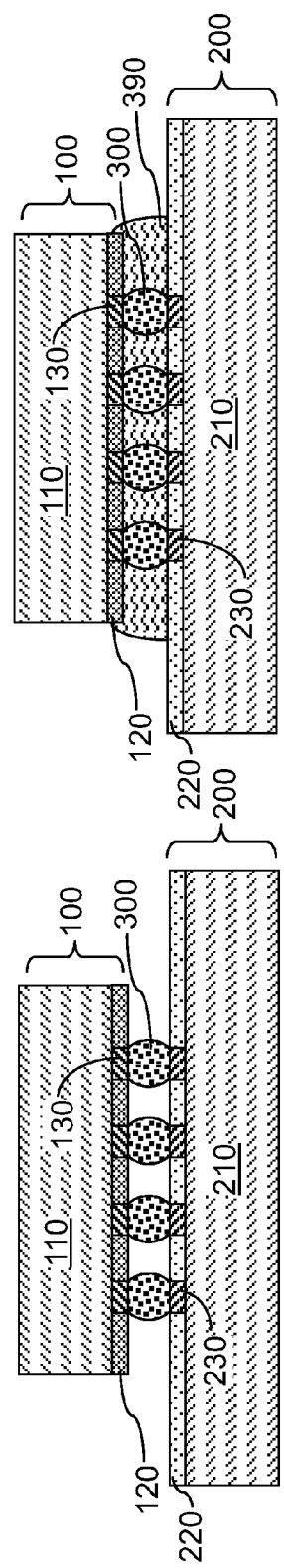

_US 8,381,966 B2_

FLIP CHIP ASSEMBLY METHOD EMPLOYING POST-CONTACT DIFFERENTIAL HEATING

BACKGROUND

The present disclosure relates to a method for bonding substrates, and particularly, to a method of bonding substrates while minimizing stress induced by a mismatch in the coefficients of thermal expansion (CTE's) between the substrates.

A first substrate can be bonded to a second substrate by employing an array of solder material portions. For example, in a solder bonding employing bonding pads, each solder material portion contacts a bonding pad on the semiconductor chip and another bonding pad on another semiconductor chip or the packaging substrate. Each bonding pad is a contiguous metal pad typically formed out of the last metal layer of a metal interconnect structure during a semiconductor manufacturing sequence. Each bonding pad is large enough to accommodate the bottom portion of a solder material portion. Typically, an array of solder material portions can be employed to provide input/output (I/O) connections between the semiconductor chip and another semiconductor chip or a packaging substrate.

Connections employing an array of solder material portions, such as C4 balls or any other type of solder balls, are susceptible to mechanical stress created by a mismatch in the coefficients of thermal expansion (CTE's) between the semiconductor chip and the other semiconductor chip or the packaging substrate. Such mechanical stress may cause cracks in the solder material portions, back-end-of-lines in chips, or the semiconductor chip(s), causing the semiconductor chip(s) to fail during flip chip assembly process and/or usage.

The problem of mechanical stress caused by the mismatch between CTE's are exacerbated when an organic substrate is employed for a packaging substrate because the mismatch of CTE's is greater between organic substrates and semiconductor substrates than between ceramic substrates and semiconductor substrates. When an organic substrate is used as a packaging substrate for a fine pitch flip chip assembly, substrate warpage can occur in the conventional reflow process during which solder balls reflow. This warpage can result in non-wetting of solder bumps and/or bridging between solder bumps, thereby decreasing the assembly yield.

In general, organic substrates expand and contract more than silicon chips. For example, a silicon chip has a CTE of about 2.6 p.p.m./° C., and an organic substrate has a CTE of about 17 p.p.m./° C. Such a mismatch between CTE's can create thermally-induced stress and strain in a bonded flip-chip structure during the flip chip assembly process. Thermally-induced stress and strain in the flip-chip structure during a reflow process often results in a failure of back-end-of-line (BEOL) interconnect structures.

Warpage of organic substrates and thermally-induced stress and strain increase as the size of an organic substrate increases, which is common for high performance chips and components. U.S. Pat. No. 7,235,886 to Chandran et al. discloses a method to reduce elongation mismatch by separately heating the chip and the second substrate prior to bonding. According to this method, a die is detached from a heater and placed onto a packaging substrate after the die and the second substrate reach different steady state temperatures. Because the die is detached from a bonder head including a heater at the time of bonding, the temperature of the die decreases quickly after the die detaches from the bonder head. As a result, reflow of solder joint is non-existent or limited in this method. Further, this method does not provide a mechanism for overcoming solder non-wet issues and solder bridging problems due to solder height variation in the array of solder material portions and in any other conductive bonding structure contacting the array of solder material portions, and substrate warpage. Organic substrates always have a certain amount of initial warpage even at room temperature due to stacking of multi-layers of metals and polymers.

In light of the above, there exists a need to provide a reliable flip chip joining method that avoids stress and strain and warpage issues due to mismatch in CTE, while at the same time ensuring that solid solder joints are formed and all solder materials are wetted to provide reliable electrical connection between a semiconductor chip and a packaging substrate.

BRIEF SUMMARY

A first substrate mounted to a bonder head and a second substrate mounted to a base plate are held at different elevated temperatures at the time of bonding that provide a substantially matched thermal expansion between the second substrate and the first substrate relative to room temperature. Further, the temperature of the solder material portions and the second substrate is raised at least up to the melting temperature after contact. The distance between the first substrate and the second substrate can be modulated to enhance the integrity of solder joints. Once the distance is at an optimum, the bonder head is detached, and the bonded structure is allowed to cool to form a bonded flip chip structure. Alternately, the bonder head can control the cooling rate of solder joints by being attached to the chip during cooling step.

According to an aspect of the present disclosure, a method of bonding substrates having different coefficients of thermal expansion is provided. The method includes: bonding an array of solder material portions to one of a first substrate and a second substrate; heating the second substrate to a first temperature and heating the first substrate to a second temperature; bringing the array of solder material portions into physical contact with the other of the first substrate and the second substrate while the first substrate is maintained at the second temperature; and heating the array of solder material portions to a third temperature that exceeds a melting temperature of the array of solder material portions, wherein thermal expansion of the second substrate substantially matches thermal expansion of the first substrate while the first substrate is at the third temperature, wherein the array of solder material portions is bonded to the first substrate and the second substrate upon cooling of the array of solder material portions.

BRIEF DESCRIPTION OF THE SEVERAL VIEWS OF THE DRAWINGS

FIG. 2A is a vertical cross-sectional view of a second substrate after solder material portions are formed thereupon according to a first embodiment of the present disclosure.

FIG. 2B is a vertical cross-sectional view of the second substrate after flux is applied over the solder material portions according to the first embodiment of the present disclosure.

FIG. 2C is a vertical cross-sectional view of the second substrate and a base plate after mounting the second substrate to the front side of the base plate according to the first embodiment of the present disclosure.

FIG. 2D is a vertical cross-sectional view of a first exemplary structure including a semiconductor substrate on which an array of solder material portions is bonded after the semiconductor substrate is mounted on a bonder head and placed over the second substrate and the base plate according to the first embodiment of the present disclosure.

FIG. 2E is a vertical cross-sectional view of the first exemplary structure after the array of solder material portions contacts the solder material portions of the second substrate according to the first embodiment of the present disclosure.

FIG. 2J is a vertical cross-sectional view of the first exemplary structure after the first substrate is dismounted from the bonder head according to the first embodiment of the present disclosure.

FIG. 2K is a vertical cross-sectional view of a bonded structure including the first substrate and the second substrate after the bonded structure is dismounted from the base plate according to the first embodiment of the present disclosure.

FIG. 2L is a vertical cross-sectional view of the bonded structure after removal of the flux according to the first embodiment of the present disclosure.

FIG. 2M is a vertical cross-sectional view of the bonded structure after applying an underfill material between the first substrate and the second substrate according to the first embodiment of the present disclosure.

DETAILED DESCRIPTION

Figure 1:
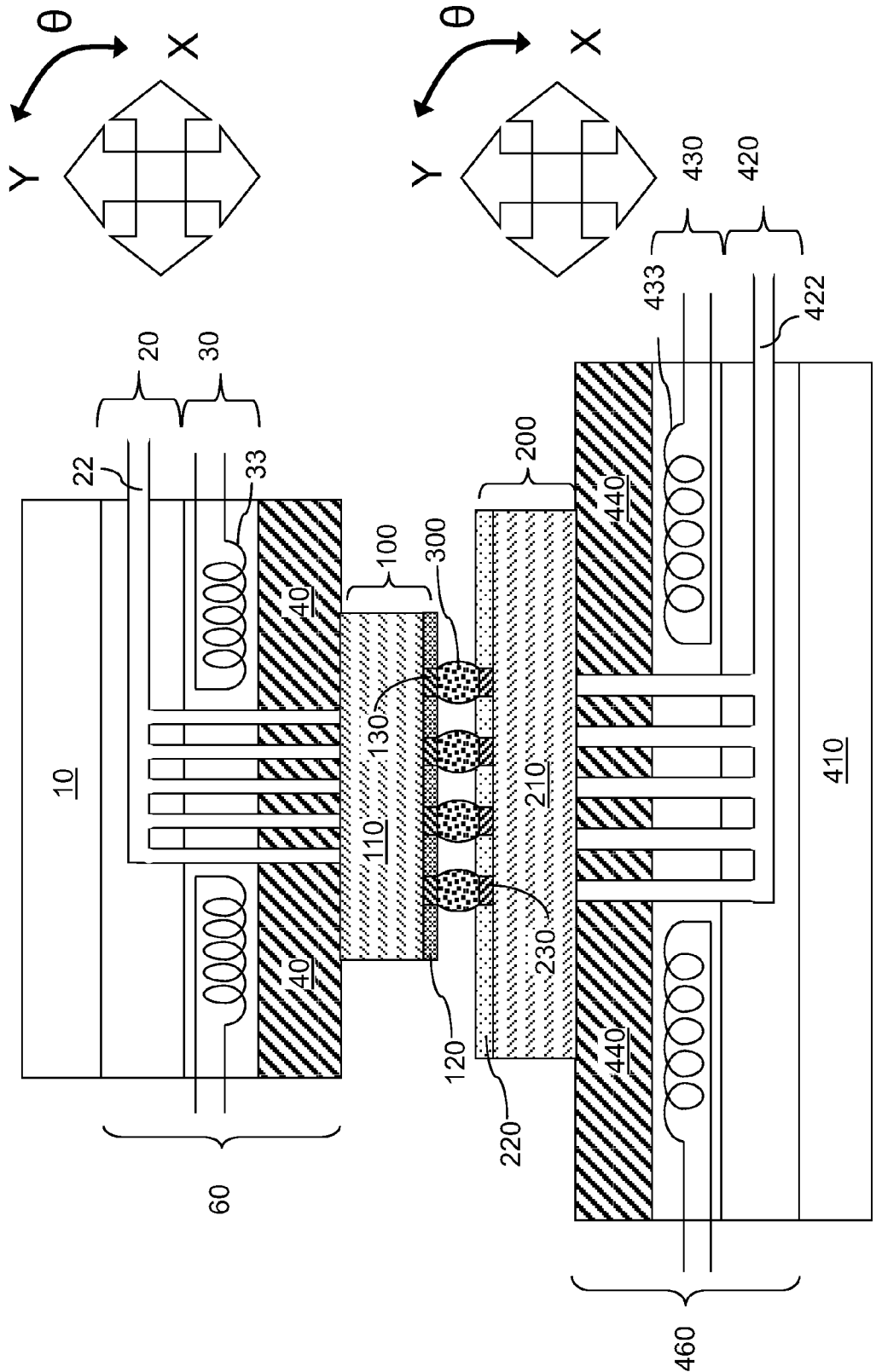
FIG. 1 is a schematic vertical cross-sectional view of an exemplary apparatus that can be employed for bonding a first substrate to a second substrate according to an embodiment of the present disclosure.

As stated above, the present disclosure relates to a method of bonding substrates while minimizing stress induced by a mismatch in the coefficients of thermal expansion (CTE's) between a first substrate and a second substrate, which is now described in detail with accompanying figures. It is noted that like and corresponding elements are referred to by like reference numerals. The drawings are not in scale.

Referring to FIG. 1, an exemplary structure that can be employed for bonding a first substrate to a substrate according to an embodiment of the present disclosure is illustrated in a vertical cross-sectional view. The exemplary structure includes a bonder head 60, a first substrate 100, an array of solder material portions 300, a second substrate 200, and a base plate 460 that functions as a platform to support the second substrate 200. A back side of the first substrate 100 is attached to the bottom side of the bonder head 60 by vacuum suction. A bonder head movement actuator 10 configured to provide vertical movement of the bonder head 60 relative to the base plate 460 is located above the bonder head 60. The second substrate 200 is initially located beneath the first substrate 100 with sufficient vertical spacing from the first substrate 100 to enable placement and bonding of the array of solder material portions 300 between the bottom surface of the first substrate 100 and the top surface of the second substrate 200. The first substrate 100 can be a semiconductor chip, an interposer, or a packaging substrate. The second substrate 200 can be a semiconductor chip, a semiconductor wafer, an interposer, a carrier, or a packaging substrate.

The first substrate 100 can include a first substrate layer 110, a first surface dielectric layer 120, and an array of first bonding pads 130 embedded within the first surface dielectric layer 120. Each bonding pad within the array of first bonding pads 130 can be electrically connected to at least one semiconductor device within the first substrate layer 110 through metal interconnect structures (not shown) embedded in the first substrate layer 110. The first substrate layer 110 includes semiconductor devices that can be, for example, field effect transistors, bipolar transistors, diodes, and/or optical semiconductor devices. The first substrate 100 is held upside down by the bonder head 60, for example, by vacuum suction so that an exposed surface of the first surface dielectric layer 120 is located at the bottommost portion of the first substrate 100.

The second substrate 200 can be another semiconductor chip or a packaging substrate or an interposer. If the second substrate 200 is another semiconductor chip, the second substrate 200 includes semiconductor devices therein. If the second substrate 200 is a packaging substrate, the second substrate 200 includes layers of wiring structures (metal interconnect structures), and can be a ceramic substrate, an organic laminated substrate, a silicone substrate, a metal substrate, or a flexible film substrate.

The second substrate 200 includes a second substrate layer 110, a second surface dielectric layer 220, and an array of second bonding pads 230 embedded within the second surface dielectric layer 220. Each bonding pad within the array of second bonding pads 230 can be electrically connected to the layers of wiring within the second substrate 200.

The bonder head movement actuator 10 can operate to enable the vertical movement of the bonder head 60 and the first substrate 100 relative to the base plate 460 and the second substrate 200 fixed thereto before the array of solder material portions 300 is bonded to both the first substrate 100 and the second substrate 200. Optionally, the bonder head movement actuator 10 may be configured to enable a lateral movement of the bond head 60 and the first substrate 100. The upper bidirectional arrows schematically represent possible directions of movement for the bonder head 60. The bonder head movement actuator 10 is configured to provide upward and downward vertical movement of the bonder head 60 relative to the base plate 460.

The bonder head 60 can include a bonder head conductive plate 40, a bonder head heater assembly 30 that includes at least one bonder head heating coil 33, and a chip support mechanism 20. The bonder head heater assembly 30 can be configured to generate and transmit heat to the bonder head conductive plate 40 by conduction and/or radiation and/or convection.

The chip support mechanism 20 holds the first substrate 100 upside down. The chip support mechanism 20 can include a vacuum manifold 22 that extends through the bonder head conductive plate 40 and to at least one hole located on the bottom surface of the bonder head conductive plate 40. The opposite end of the vacuum manifold 22 includes at least one vacuum connection port that is configured to be connected to a vacuum pump. The vacuum suction provided to the back side of the first substrate 100 can mechanically support the first substrate 100. Alternately, any other chip support mechanism 20 that is capable of mechanically supporting the first substrate 100 can be employed instead of the substrate support mechanism employing vacuum pumping.

The array of solder material portions 300 are typically attached to the array of first bonding pads 130 prior to mounting on the bonder head 60 employing methods known in the art. The bonder head 60 is configured to hold the first substrate 100 upside down under the horizontal plane of the bottommost surface of the low thermal conductivity material layer 50. The second substrate 200 is held upright so that an exposed surface of the second surface dielectric layer 220 is located at the topmost portion of the second substrate 200 and faces the bottommost surface of the first substrate 100.

The base plate 460 includes a base conductive plate 440, a base plate heater assembly 430 that includes at least one base plate heating coil 433, and a substrate support mechanism 420. The base conductive plate 40 includes a high thermal conductivity material. The second substrate 200 can be held at a fixed location by the base plate 460. A base plate movement actuator 410 may be located beneath the base plate 460, and may be configured to move the base plate 460 laterally and/or vertically. The lower bidirectional arrows schematically represent possible directions of movement for the upper portion of the base plate 460 and the second substrate 200.

The base plate heater assembly 430 is configured to generate and transmit heat to the base conductive plate 440 by conduction and/or radiation and/or convection. Typically, the base plate heater assembly 430 is configured to transmit heat to the base conductive plate 440 by conduction. The at least one base plate heating coil 433 is electrically connected to an electrical power source (not shown) that provides electrical power in the form of direct current (DC) or alternate current (AC).

The substrate support mechanism 420 holds the second substrate 200 in the upright position. The substrate support mechanism 420 can include a vacuum manifold 422 that extends through the base conductive plate 440 and to at least one hole located on the bottom surface of the base conductive plate 440. The opposite end of the vacuum manifold 422 includes at least one vacuum connection port that is configured to be connected to a vacuum pump. The vacuum suction provided to the back side of the second substrate 200 can mechanically support the second substrate 200. Alternately, any other substrate support mechanism 420 that is capable of mechanically supporting the second substrate 200 can be employed instead of the substrate support mechanism employing vacuum pumping.

Referring to FIG. 2A, a second substrate 200 as provided, which can be the same as the second substrate 200 illustrated in FIG. 1. For example, the second substrate 200 can include a second substrate layer 110, a second surface dielectric layer 220, and an array of second bonding pads 230 that is embedded within the second surface dielectric layer 220. Each bonding pad within the array of second bonding pads 230 can be electrically connected to the layers of wiring within the second substrate 200.

The second substrate 200 can be a packaging substrate or a semiconductor substrate. In case the second substrate 200 is a packaging substrate, the second substrate 200 can be an organic substrate, a film substrate, or a ceramic substrate.

While the present disclosure can be employed to bond a first substrate with any type of substrate, an embodiment of the present disclosure can be particularly advantageous for bonding a first substrate with a packaging substrate that has a significant mismatch in coefficient of thermal expansion with the first substrate.

Surface solder material portions 240 can be formed directly on top surfaces of the array of second bonding pads 230. Surface solder material portions 240 are additional solder material portions that can be employed to facilitate the solder bonding process by wetting underlying surfaces of metallic structures, which can be bonding pads, metal pillars, or any other type of metallic structure. Surface solder material portions 240 can include the same or different material as the material employed for solder material portions. For example, the surface solder material portions 240 can have the same material as the material of an array of solder material portions to be subsequently used to bond the second substrate 200 to the first substrate 100.

Referring to FIG. 2B, a solder flux (or a "flux") can be optionally applied to the top surfaces of the surface solder material portions 240. The solder flux is a chemical that removes surface oxides from metallic surfaces including the surfaces of the surface solder material portions 240 to facilitate subsequent solder bonding. Flux can be applied only substrate side, only chip side, or both substrate side and chip side. Optionally, a vapor phase flux such as formic acid can be used.

The solder flux can be applied at room temperature. As used herein, "room temperature" refers to a temperature range from 20 degrees Celsius to 27 degrees Celsius. The step of FIG. 2B is optional, and may be omitted in some embodiments.

Referring to FIG. 2C, the second substrate 200 is mounted to the front side a base plate 460, which can be the same as the base plate 460 described in FIG. 1. The base plate 460 can be placed on a base plate movement actuator 410 (not shown in FIG. 2C; See FIG. 1). The second substrate 200 can be mounted on the base plate 460 by suction applied to the back side of the second substrate layer 110 through the base plate 460. The base plate 460 can minimize the warpage of the second substrate 200 during the boding process by maintaining the second substrate 200 flat through application of vacuum suction to the back surface of the second substrate 200. In one embodiment, the second substrate 200 can be mounted to the base plate 460 at room temperature or at a temperature less than the temperature of the second substrate 200 during a subsequent reflow step for solder material portions.

Referring to FIG. 2D, a first substrate 100 is provided, which can be the same as the first substrate 100 shown in FIG. 1. For example, the first substrate 100 can include a first substrate layer 110, a first surface dielectric layer 120, and an array of first bonding pads 130 embedded within the first surface dielectric layer 120.

An array of solder material portions 300 is bonded to the array of first bonding pads 130 employing methods known in the art. Once the array of solder material portions 300 is bonded to the array of first bonding pads 130, each bonding pad within the array of first bonding pads 130 can be electrically connected to at least one semiconductor device within the first substrate layer 110 through metal interconnect structures (not shown) embedded in the first substrate layer 110.

Once the array of solder material portions 300 is bonded to the first substrate 100, the first substrate 100 is held upside down and is mounted to a bonder head 60, which can be the same as the bonder head 60 in FIG. 1. A bonder head movement actuator 10 can be present over the bonder head 60 (See FIG. 1). The array of solder material portions 300 faces the second substrate 200 after the mounting of the first substrate 100 on the bonder head 60. The bottom surface of the bonder head 60 can be flat so that the upper surface of first substrate 100 can be held flat, for example, by vacuum suction, during subsequent bonding. In one embodiment, the first substrate 100 can be mounted to the bonder head 60 at room temperature or at a temperature less than the temperature of the bonder head 60 during a subsequent reflow step for the array of solder material portions 300.

The second substrate 200 has a different coefficient of thermal expansion than the first substrate 100. In an illustrative example, the second substrate 200 can have a coefficient of thermal expansion that is at least one and a half times the corresponding coefficient of thermal expansion of the first substrate 100 at each temperature within the temperature range between 20 degrees Celsius and 250 degrees Celsius. This condition can be satisfied if the second substrate 200 is an organic packaging substrate and the first substrate 100 is a silicon chip, a silicon germanium chip, or a germanium chip. It is understood that coefficients of thermal expansion for the second substrate 200 and the first substrate 100 are compared at the same temperature, which can be any temperature between 20 degrees Celsius and 250 degrees Celsius.

Before or after the first substrate 100 is placed over the second substrate 200, the second substrate is heated to a first temperature greater than room temperature. Further, the first substrate 100 is heated to a second temperature different from the first temperature and greater than room temperature. The second temperature is selected to be equal to or greater than the melting temperature of the material of the array of solder material portions 300. The melting temperature refers to the temperature at which the material of the array of solder material portions 300 begins to liquefy, i.e., melt.

The first temperature and the second temperature are lower than the melting temperature of the array of the solder material portions 300 in order to prevent premature reflow of the array of the solder material portions 300. The first temperature may be lesser than, equal to, or greater than the second temperature.

In case the array of solder material portions includes conventional solder materials, the second temperature can be at or greater than 200 degrees Celsius. In case the second substrate 200 is an organic packaging substrate, the corresponding first temperature is typically at or less than 100 degrees Celsius. The thermal expansion of the first substrate 100 at the second temperature (which is the increase in a lateral dimension per unit length of the first substrate 100 at the second temperature relative to 20 degrees Celsius) can be between 70% and 130%, and preferably between 90% and 110%, and more preferably between 97% and 103%, of the thermal expansion of the second substrate 200 (which is the increase in a lateral dimension per unit length of the second substrate 200 at the first temperature relative 20 degrees Celsius).

Referring to FIG. 2E, the bonder head movement actuator 10 (See FIG. 1) or the base plate movement actuator (See FIG. 1) is employed to move the first substrate 100 or the second substrate 200 close to each other until the array of solder material portions 300 contacts the surface solder material portions 240 of the second substrate 200. The relative movement of the first substrate 100 and the second substrate 200 is performed while the second substrate 200 is held at the first temperature and the first substrate 100 is held at the second temperature. Thus, the array of solder material portions 300 is brought into physical contact with the second substrate 200 while the first substrate 100 is maintained at the second temperature. The bonder head 60 remains in contact with the back side of the first substrate 100 even after the array of solder material portions 300 contacts the second substrate 200.

Figure 2F:
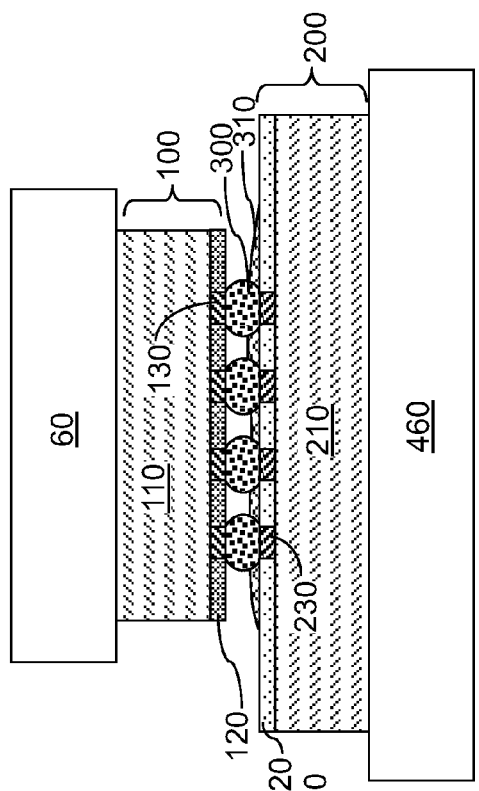
FIG. 2F is a vertical cross-sectional view of the first exemplary structure after the temperature of the array of solder material portions is raised above the melting temperature of the array of solder material portions and the solder material portions merge into the array of solder material portions according to the first embodiment of the present disclosure.

Referring to FIG. 2F, the temperature of the array of solder material portions 300 is raised above the melting temperature of the array of solder material portions 300 after the array of solder material portions 300 is brought into physical contact with the second substrate 200. The array of solder material portions 300 is heated to the third temperature by providing heat from the bonder head 60 through the first substrate 100 to the array of solder material portions 300 while the bonder head 60 maintains physical contact with the first substrate 100. The third temperature exceeds the melting temperature by 0.1 to 250 degrees Celsius, and typically by 1 to 200 degrees Celsius. The temperature ramp from the second temperature to the third temperature may take about 1 seconds to 10 seconds, although lesser and greater ramp rates can also be employed depending on the thermal conductivity of the first substrate 100 and the size of the solder material portions in the array of solder material portions 300.

The first temperature and the third temperature are selected so that the thermal expansion of the second substrate 200 at the third temperature "substantially" matches the thermal expansion of the first substrate 100 at the first temperature. The thermal expansion of the second substrate 200 is the percentage increase in lateral dimensions of the second substrate 200 at the third temperature relative to the corresponding lateral dimensions of the second substrate 200 at 20 degrees Celsius. The thermal expansion of the first substrate 100 is the percentage increase in lateral dimensions of the first substrate 100 at the first temperature relative to the corresponding lateral dimensions of the first substrate 100 at 20 degrees Celsius. As used herein, the thermal expansion of a first element "substantially" matches the thermal expansion of a second element if the increase in a lateral dimension per unit length of the first element at an elevated temperature relative to 20 degrees Celsius is between 70% and 130% of the corresponding increase in a lateral dimension per unit length of the second element at another elevated temperature relative to 20 degrees Celsius.

The third temperature is greater than the melting temperature of the array of solder material portions 300, which is greater than the first temperature. Thus, there necessarily exists a vertical temperature gradient across the first substrate 100 and the second substrate 200, and due to limitations in thermal conductivity, the temperature of the array of solder material portions 300 is between the melting temperature and the third temperature while the first substrate 100 is held at the third temperature and the second substrate 200 is held at the first temperature.

As the temperature of the array of solder material portions 300 rises above the melting temperature of the material of the array of solder material portions 300, which can be substantially the same as the melting temperature of the surface solder material portions 240 (See FIG. 2E), the surface solder material portions 240 melt and merge into the array of solder material portions 300. During the reflow of the array of solder material portions 300, the bonder head 60 continues to provide heat to the array of solder material portions 300 to maintain the array of solder material portions 300 at the third temperature, which may last between 0.1 second to 30 seconds, and typically from 0.5 second to 5 seconds.

The base plate 460 is held at the first temperature while the array of solder material portions 300 is heated to the third temperature. Because the second substrate 200 has a greater thermal mass than the array of solder material portions 300 by orders of magnitude, and the heat flow from the first substrate 100 into the second substrate 200 is constricted at the array of solder material portions 300, the temperature of the second substrate 200 remains substantially the same as the first temperature except for local heating directly underneath the array of solder material portions 300. The second substrate 200 and the first substrate 100 are held flat by the flat top surface of the base plate 460 and the flat bottom surface of the bonder head 60 and the vacuum suctions applied to the back side of the second substrate 200 and to the back side of the first substrate 100. The heat required to reflow the array of solder material portions 300 is supplied only by a heater within the bonder head 60, but a heater in the base plate 460 merely maintains the second substrate 200 at the first temperature, i.e., does not provide any extra heat that is required to reflow the array of solder material portions 300.

Figure 2H:
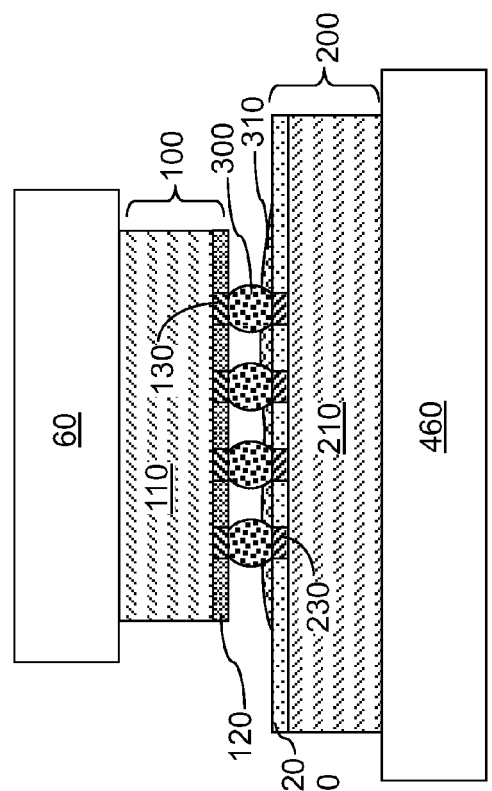
FIG. 2H is a vertical cross-sectional view of the first exemplary structure after the distance between the first substrate and the second substrate is increased above a bonding distance according to the first embodiment of the present disclosure.
Figure 2G:
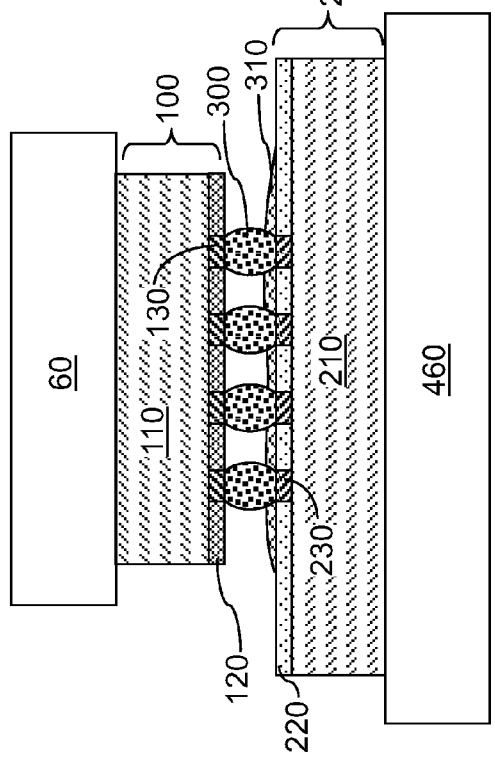
FIG. 2G is a vertical cross-sectional view of the first exemplary structure after the distance between the first substrate and the second substrate is decreased below the bonding distance according to the first embodiment of the present disclosure.

Referring to FIG. 2G, the vertical distance between the first substrate 100 and the second substrate 200 can be changed while the temperature of the array of solder material portions 300 is above the melting temperature of the array of solder material portions 300. For example, the distance between the first substrate 100 and the second substrate 200 can be decreased below a bonding distance, which is defined as the vertical distance between the first substrate 100 and the second substrate after bonding, i.e., after the array of solder material portions 300 solidify. The vertical distance is measured between the topmost surface of the second substrate 200 including any bonding pads or equivalent structures and the bottommost surface of the first substrate 100 including any bonding pads or equivalent structure, and the array of solder material portions 300 is treated as if not present for the purpose of measuring the bonding distance.

The distance between the first substrate 100 and the second substrate 200 can be subsequently increased above the bonding distance as illustrated in FIG. 2H. In general, the first substrate 100 can be alternately moved relative to the second substrate 200 to distances less than the bonding distance at least once and/or greater than the bonding distance at least once while temperature of the array of solder material portions 300 remains above the melting temperature of the array of solder material portions 300.

The dynamic control of the distance between the first substrate 100 and the second substrate 200, which is referred to as "Z-height control." The Z-height control is performed while the solder material of the array of solder material portions 300 remains melted so that all solder bumps are jointed without interfaces between solder materials or solder bridging. In one embodiment, the nonuniformity of the bump height and/or the warpage of the semiconductor substrate 100 and/or the second substrate 200 can be measured prior to performing the Z-height control, and the amplitude of vertical movement during the Z-height control can be determined based on the measured values of the nonuniformity of the bump height and/or the warpage of the semiconductor substrate 100 and/or the second substrate 200. For example, the greater the nonuniformity of the bump height, the warpage of the semiconductor substrate 100, or the warpage of the second substrate 200, the greater the amplitude of the vertical movement during processing steps corresponding to FIGS. 2G and 2H. Preferably, the amplitude of the vertical movement of the first substrate 100 relative to the second substrate 200 during the Z-height control step is at least the greatest of the nonuniformity of the bump height, the warpage of the semiconductor substrate 100, and the warpage of the second substrate 200. The steps corresponding to FIGS. 2G and 2H may be repeated multiple times as needed.

The duration of the Z-height control step can be from 1 second to 30 seconds, and typically from 3 seconds to 10 seconds, depending on the difference between the third temperature, at which the array of solder material portions 300 is maintained during the Z-height control step, and the melting temperature of the solder material of the array of solder material portions 300 and depending on the nonuniformity of the bump height, the warpage of the semiconductor substrate 100, and the warpage of the second substrate 200. The Z-height control step, in combination with a unidirectional heating of the array of solder material portions employing heat transfer only from the bonder head 60 through the first substrate 100 to the array of solder material portions 300, can enhance high assembly yield and eliminate low-k failure using z-height control.

Figure 2I:
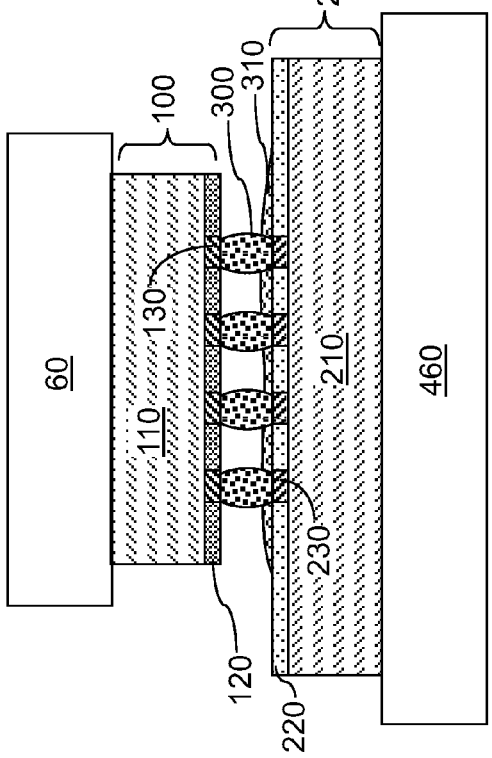
FIG. 2I is a vertical cross-sectional view of the first exemplary structure after the first substrate and the array of solder material portions is cooled below the melting temperature of the array of solder material portions according to the first embodiment of the present disclosure.

Referring to FIG. 2I, the first substrate 100 is vertically moved relative to the second substrate 200 to a position that is spaced from the second substrate 200 by the bonding distance, i.e., the distance at which the first substrate 100 and the second substrate 200 are maintained after bonding. The temperature of the array of solder material portions 300 is maintained at the third temperature from the time the temperature reaches the third temperature at the step of FIG. 2F throughout the steps of FIGS. 2G and 2H, and until the first substrate 100 is spaced from the second substrate 200 by the bonding distance at the step of FIG. 2I. The distance between the first substrate 100 and the second substrate 200 is maintained at the bonding distance during cooling of the array of solder material portions 300 from the third temperature that is above the melting temperature at least to a temperature below the melting temperature. Preferably, the array of solder material portions 300 is cooled to a temperature lower than the second temperature and greater than room temperature.

The array of solder material portions 300 is bonded to the second substrate 200 and to the first substrate 100 upon cooling of the array of solder material portions 300, thereby forming a bonded structure. The array of solder material portions 300 is bonded to the first substrate 100 and the second substrate 200 upon cooling of the array of solder material portions 300 to a fourth temperature, which is lower than the melting temperature of the material of the array of solder material portions 300, while the second substrate 200 is held at the first temperature. The fourth temperature can be lower than the melting temperature of solder by a temperature difference from 0.1 degree Celsius to 200 degree Celsius. The array of solder material portions 300 is bonded directly to second bonding pads 230 on the second substrate 200 upon cooling of the array of solder material portions 300. The second substrate 200 is held upon the base plate 460, for example, by vacuum suction throughout the steps corresponding to FIGS. 2C-2I, thereby minimizing warpage of the second substrate 200. The first substrate 100 is held by the bonder head 60, for example, by vacuum suction throughout the steps corresponding to FIGS. 2D-2I, thereby minimizing warpage of the first substrate 100.

Referring to FIG. 2J, once the array of solder material portions 300 is cooled below the melting temperature, the first substrate 100 can be dismounted from the bonder head 60. The dismounting of the first substrate 100 from the bonder head 60 can be effected, for example, by discontinuing the vacuum suction applied to the back side of the first substrate 100, and subsequently relatively moving the bonder head 60 away from the bonded structure including the first substrate 100, the array of solder material portions 300, and the second substrate 200. The temperature at which the first substrate 100 can be dismounted from the bonder head 60 can be selected to minimize the warpage of the bonded structure (100, 200, 300), and can be selected from a temperature range between 150 degrees Celsius and room temperature.

Referring to FIG. 2K, the bonded structure (100, 200, 300) can be allowed to further cool down, for example, to room temperature, and subsequently dismounted from the base plate 460, for example, by discontinuing the vacuum suction applied to the back side of the second substrate 200, and subsequently picking up or otherwise removing the bonded structure (100, 200, 300) from the base plate 460.

Referring to FIG. 2L, if present, the flux 310 can be removed by employing methods known in the art.

Referring to FIG. 2M, an underfill material 380 can be applied between the first substrate 100 and the second substrate 200 and around the array of solder material portions 300 to provide additional mechanical support between the first substrate 100 and the second substrate 200 and to allow absorption of mechanical stress applied to the array of solder material portions 300 as known in the art.

Figure 3A:
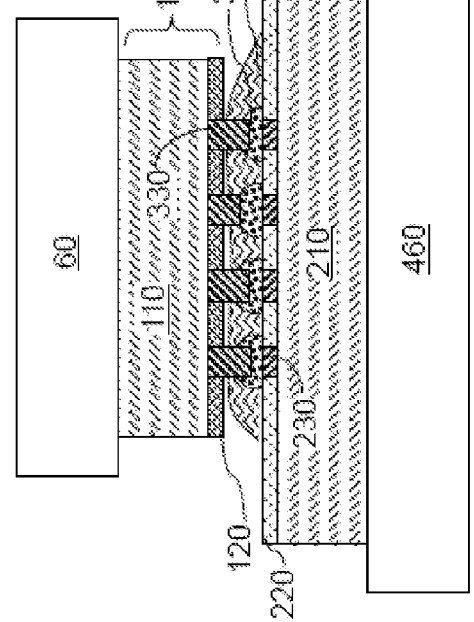
FIG. 3A is a vertical cross-sectional view of a second exemplary structure prior to bonding according to a second embodiment of the present disclosure.

Referring to FIG. 3A, a second exemplary structure according to a second embodiment of the present disclosure is illustrated at a processing step prior to bonding, which corresponds to the step of FIG. 2D in the first embodiment.

In the second embodiment, the second substrate 200 includes an array of metal structures such as an array of second bonding pads 230. The array of solder material portions 300 is bonded to the array of second bonding pads 230. The flux 310 may be optionally applied around the array of solder material portions 300 thereafter.

The first substrate 100 includes an array of metal pillars 330 and includes a metallic material such as copper. In one case, the array of metal pillars 330 can be an array of copper pillars consisting substantially of copper. The array of metal pillars 330 protrudes out of the surface of a first substrate 100, which is a bottom surface of the first substrate 100 while the first substrate 100 is held upside down.

The first substrate 100 is held at the second temperature, and the second substrate 200 is held at the first temperature employing the same temperature control schemes as in the first embodiment.

Figure 3B:
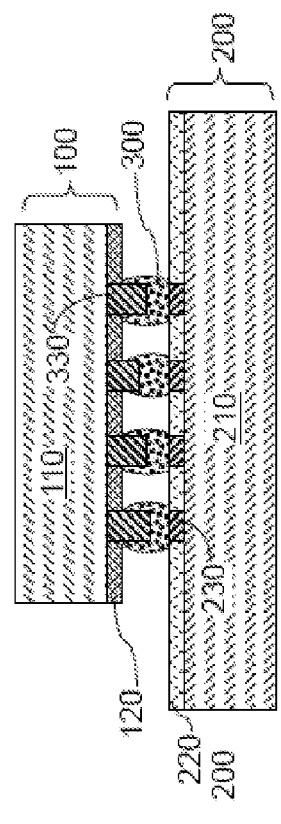
FIG. 3B is a vertical cross-sectional view of the second exemplary structure after the distance between the first substrate and the second substrate is decreased below the bonding distance according to the second embodiment of the present disclosure.

The processing steps of FIGS. 2E, 2F, and 2G are subsequently performed to form the second exemplary structure illustrated in FIG. 3B. At this step, the distance between the first substrate 100 and the second substrate 200 is decreased below the bonding distance.

In the second embodiment, the array of solder material portions 300 is bonded to the array of metal pillars 330 when the array of solder material portions 300 is brought into physical contact with the second substrate 200. The array of solder material portions 300 contacts sidewalls of the array of metal pillars after the array of solder material portions is brought into physical contact with the second substrate 200. The temperature of the first substrate 100 is maintained at the third temperature at this step as in the first embodiment.

Figure 3C:
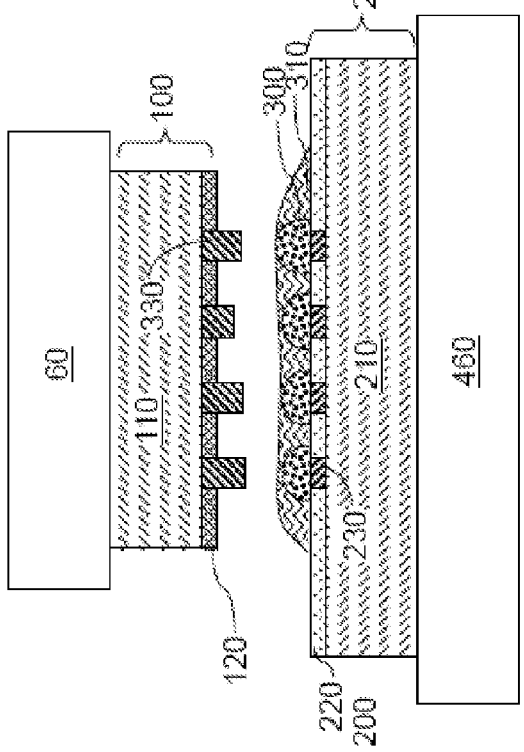
FIG. 3C is a vertical cross-sectional view of the second exemplary structure after the distance between the first substrate and the second substrate is increased above a bonding distance according to the second embodiment of the present disclosure.

Referring to FIG. 3C, the vertical distance between the first substrate 100 and the second substrate 200 is increased above the bonding distance as in the processing step of FIG. 2G in the first embodiment.

Figure 3D:
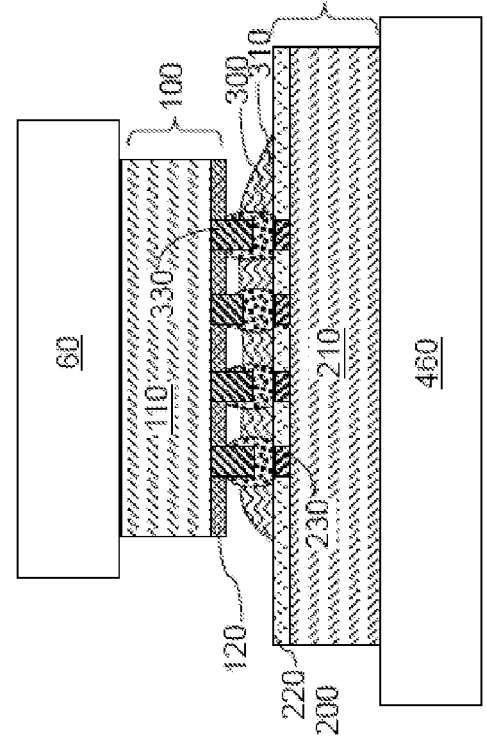
FIG. 3D is a vertical cross-sectional view of the second exemplary structure after the bonded structure including the first substrate and the second substrate is cooled below the melting temperature of the array of solder balls, and the flux is removed, according to the second embodiment of the present disclosure.

Referring to FIG. 3D, the bonded structure (100, 200, 300) including the first substrate 100 and the second substrate 200 is cooled below the melting temperature of the array of solder balls 300 in the same manner as in the processing steps of FIGS. 2K and 2G in the first embodiment. If present, the flux 310 is removed.

Figure 4A:
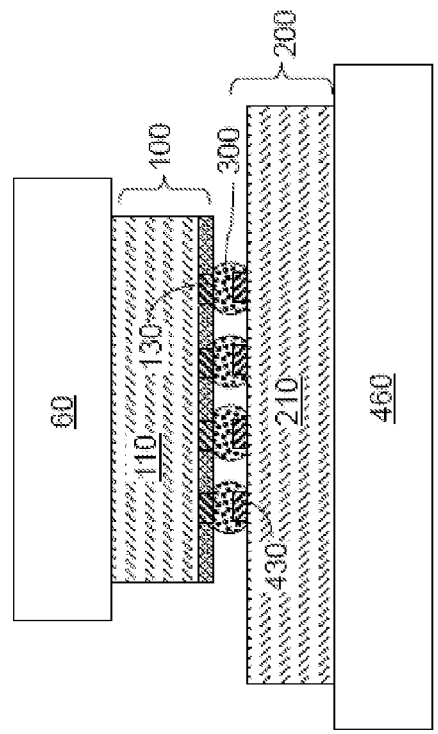
FIG. 4A is a vertical cross-sectional view of a third exemplary structure prior to bonding according to a third embodiment of the present disclosure.

Referring to FIG. 4A, a third exemplary structure according to a third embodiment of the present disclosure is illustrated at a processing step prior to bonding, which corresponds to the step of FIG. 2D in the first embodiment.

In the third embodiment, the array of solder material portions 300 can be bonded to an array of metal structures located on the one of the two substrates. FIG. 4A illustrates a case in which the array of solder balls 300 is bonded to the first substrate 100 before the first substrate 100 is heated to the second temperature. In this case, the array of solder balls 300 can be bonded to the array of first bonding pads 130. The second substrate 200 may, or may not, not include a second surface dielectric layer 220. The first substrate 100 includes a first array of metal structures such as an array of second bonding pads 130. A flux is not required in this embodiment, but may optionally be employed.

A first array of metal structures (such as bonding pads or metal pillars) is located on the first substrate 100, and a second array of metal structures 430 is located on the second substrate 200. In general, the array of solder material portions 300 is bonded to one of the first substrate 100 and the second substrate 200 at this step. The array of solder material portions 300 can be bonded to a first array of metal structures (such as bonding pads or metal pillars) located in the first substrate 100 or to a second array of metal structures 430 located in the second substrate 200 at this step.

The second array of metal structures 430 can be an array of bonding pads or an array of metal pillars including a metallic material such as copper. If an array of metal pillars is employed for the second array of metal structures 430, the array of metal pillars can be an array of copper pillars consisting substantially of copper. The second array of metal structures 430 may be located above the surface of the second substrate layer 210, or may be coplanar with, or recessed relative to, the top surface of the second substrate layer 210 if the top surface of the second substrate layer 210 includes a dielectric surface.

The first substrate 100 is held at the second temperature, and the second substrate 200 is held at the first temperature employing the same temperature control schemes as in the first embodiment.

Figure 4B:
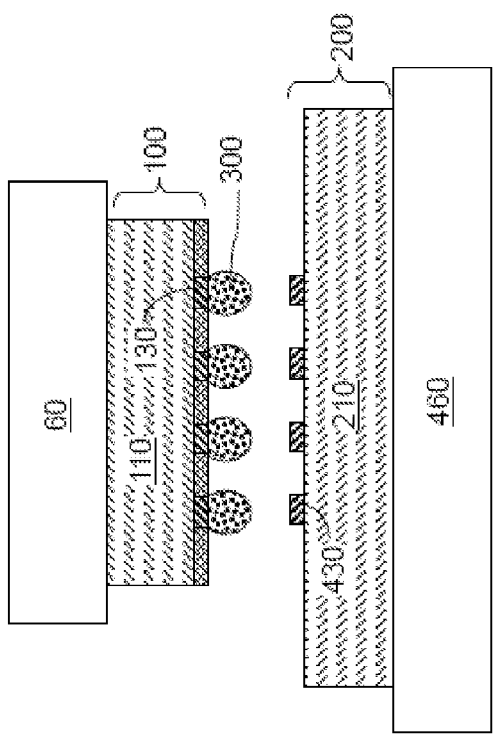
FIG. 4B is a vertical cross-sectional view of the third exemplary structure after the distance between the first substrate and the second substrate is decreased below a bonding distance according to the third embodiment of the present disclosure.

The processing steps of FIGS. 2E, 2F, and 2G are subsequently performed to form the second exemplary structure illustrated in FIG. 4B. At this step, the distance between the first substrate 100 and the second substrate 200 is decreased below the bonding distance.

In the third embodiment, the array of solder material portions 300 is bonded to the second array of metal structures 430 when the array of solder material portions 300 is brought into physical contact with the second substrate 200. The temperature of the first substrate 100 is maintained at the third temperature at this step as in the first embodiment.

Figure 4C:
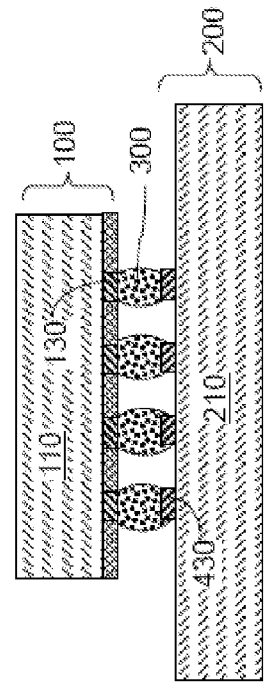
FIG. 4C is a vertical cross-sectional view of the third exemplary structure after the distance between the first substrate and the second substrate is increased above the bonding distance according to the third embodiment of the present disclosure.

Referring to FIG. 4C, the vertical distance between the first substrate 100 and the second substrate 200 is increased above the bonding distance as in the processing step of FIG. 2G in the first embodiment.

Figure 4D:
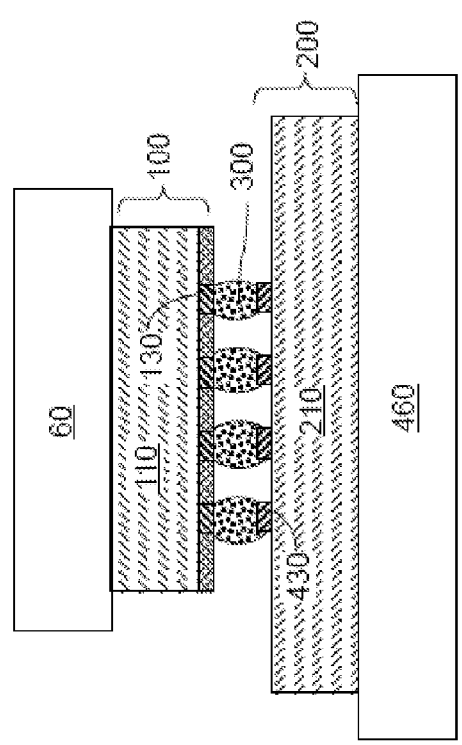
FIG. 4D is a vertical cross-sectional view of the third exemplary structure after the bonded structure including the first substrate and the second substrate is cooled below the melting temperature of the array of solder balls, and the flux is removed, according to the third embodiment of the present disclosure.

Referring to FIG. 4D, the bonded structure (100, 200, 300) including the first substrate 100 and the second substrate 200 is cooled below the melting temperature of the array of solder balls 300 in the same manner as in the processing steps of FIGS. 2K and 2G in the first embodiment. If present, the flux 310 is removed.

While the disclosure has been described in terms of specific embodiments, it is evident in view of the foregoing description that numerous alternatives, modifications and variations will be apparent to those skilled in the art. Accordingly, the disclosure is intended to encompass all such alternatives, modifications and variations which fall within the scope and spirit of the disclosure and the following claims.

What is claimed is:

1. A method of bonding substrates having different coefficients of thermal expansion, said method comprising:
    bonding an array of solder material portions to one of a first substrate and a second substrate;
    mounting said first substrate to a bonder head and said second substrate to a base plate;
    heating said second substrate to a first temperature and heating said first substrate to a second temperature, wherein said first temperature and second temperature do not exceed melting temperature of solder material portions in said array;
    bringing said array of solder material portions into physical contact with the other of said first substrate and said second substrate while said first substrate is maintained at said second temperature and said second substrate is held at said first temperature;
    heating said array of solder material portions to a third temperature that exceeds a melting temperature of said array of solder material portions, wherein thermal expansion of said second substrate substantially matches thermal expansion of said first substrate while said first substrate is at said third temperature and said second substrate is maintained at said first temperature, wherein said array of solder material portions is bonded to said first substrate and said second substrate upon cooling of said array of solder material portions; and
    dismounting a bonded structure including said first substrate and said second substrate from said bonder head after said array of solder material portions cools down to a fourth temperature lower than said second temperature.

2. The method of claim 1, further comprising moving said first substrate relative to said second substrate to reduce a vertical distance therebetween at least once while said array of solder material portions is above said melting temperature of said array of solder material portions; and
    moving said first substrate relative to said second substrate to increase said vertical distance at least once while said array of solder material portions is above said melting temperature of said array of solder material portions.

3. The method of claim 1, wherein said fourth temperature is lower than said melting temperature of solder material portions by a temperature difference from 0.1 degree Celsius to 200 degree Celsius.

4. The method of claim 1, wherein said third temperature exceeds said melting temperature by a temperance difference from 0.1 degree Celsius to 250 degrees Celsius.

5. The method of claim 1, further comprising changing a distance between said first substrate and said second substrate while said array of solder material portions is above said melting temperature of said array of solder material portions.

6. The method of claim 1, wherein said array of solder material portions is heated to said third temperature by providing heat from said bonder head through said first substrate to said array of solder material portions while said bonder head contacts said first substrate.

7. The method of claim 6, wherein said base plate is held at said first temperature while said array of solder material portions is heated to said third temperature.

8. The method of claim 7, further comprising changing a distance between said first substrate and said second substrate while temperature of said array of solder material portions is above said melting temperature of said array of solder material portions.

9. The method of claim 2, wherein said method further comprises maintaining said vertical distance between said first substrate and said second substrate at said bonding distance during cooling of said array of solder material portions from above said melting temperature to below said melting temperature.

10. The method of claim 1, wherein a coefficient of thermal expansion of said second substrate is at least one and a half times a coefficient of thermal expansion of said first substrate at each temperature in a temperature range from 20 degrees Celsius to 250 degree Celsius.

11. The method of claim 1, further comprising forming additional solder material portions directly on said second substrate prior to heating said second substrate to said first temperature.

12. The method of claim 1, wherein said array of solder material portions is bonded to an array of bonding pads comprising a metallic material and located on said first substrate prior to bringing said array of solder material portions into physical contact with the other of said first substrate and said second substrate.

13. The method of claim 12, wherein said array of solder material portions contacts horizontal surfaces of said bonding pads and does not contact sidewalls of said array of bonding pads.

14. The method of claim 1, wherein said array of solder material portions is bonded to said one of said first substrate and said second substrate through an array of metal structures comprising a metallic material when said array of solder material portions is brought into physical contact with the other of said first substrate and said second substrate.

15. The method of claim 14, wherein said array of solder material portions contacts sidewalls of said array of metal pillars after said array of solder material portions is brought into physical contact with the other of said first substrate and said second substrate.

16. The method of claim 1, wherein said array of solder material portions is bonded to the other of said first substrate and said second substrate through an array of metal structures comprising a metallic material when said array of solder material portions is brought into physical contact with the other of said first substrate and said second substrate.

17. The method of claim 16, wherein said array of solder material portions is bonded to another array of metal structures located on said one of said first substrate and said second substrate before said array of solder material portions is brought into physical contact with the other of said first substrate and said second substrate.

* * * * *